United States Patent
Ryu

(10) Patent No.: US 10,636,107 B2
(45) Date of Patent: Apr. 28, 2020

(54) SYSTEM AND METHOD FOR PLANNING YARD CRANE WORK

(71) Applicant: PUSAN NATIONAL UNIVERSITY INDUSTRY-UNIVERSITY COOPERATION FOUNDATION, Busan (KR)

(72) Inventor: Kwang Ryel Ryu, Busan (KR)

(73) Assignee: PUSAN NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 0 days.

(21) Appl. No.: 16/221,047

(22) Filed: Dec. 14, 2018

(65) Prior Publication Data

US 2019/0197644 A1 Jun. 27, 2019

(30) Foreign Application Priority Data

Dec. 27, 2016 (KR) .................. 10-2016-0179604
Mar. 14, 2017 (KR) .................. 10-2017-0031546

(51) Int. Cl.
*G06F 7/70* (2006.01)
*G06T 7/00* (2017.01)
(Continued)

(52) U.S. Cl.
CPC .......... *G06Q 50/28* (2013.01); *B65G 63/004* (2013.01); *B66C 13/18* (2013.01); *B66C 13/48* (2013.01);
(Continued)

(58) Field of Classification Search
None
See application file for complete search history.

(56) References Cited

FOREIGN PATENT DOCUMENTS

| JP | 9-190483 A | 7/1997 |
|----|------------|--------|
| KR | 10-2009-0016139 A | 2/2009 |

(Continued)

OTHER PUBLICATIONS

Lee et al., "Quay Crane Scheduling Considering the Workload of Yard Blocks in an Automated Container Terminal," Journal of Intelligence and Information System, 14(4):103-116, (2008). [English Abstract].

(Continued)

*Primary Examiner* — Bhavesh V Amin
(74) *Attorney, Agent, or Firm* — Alston & Bird LLP

(57) ABSTRACT

A system and method for planning yard crane work are provided. The system for planning yard crane work includes a scenario providing unit configured to provide a plurality of work scenarios, a first evolution unit configured to evolve a first solution group including a plurality of first candidate solutions using a genetic algorithm, and a second evolution unit configured to evolve a second solution group including a plurality of second candidate solutions using the genetic algorithm. The first evolution unit evaluates each of the first candidate solutions based on a second strategy which is the most superior candidate solution of the second solution group. The second evolution unit evaluates each of the second candidate solutions based on a first strategy which is the most superior candidate solution of the first solution group. Evaluating each of the first and second candidate solutions is based on a work scenario arbitrarily selected from the plurality of work scenarios.

11 Claims, 7 Drawing Sheets

(51) Int. Cl.
  *G06Q 50/28* (2012.01)
  *G06N 3/12* (2006.01)
  *B66C 13/18* (2006.01)
  *B66C 19/00* (2006.01)
  *B66C 13/48* (2006.01)
  *B65G 63/00* (2006.01)
(52) U.S. Cl.
  CPC ........... *B66C 19/007* (2013.01); *G06N 3/126* (2013.01); *B66C 2700/01* (2013.01)

(56) References Cited

FOREIGN PATENT DOCUMENTS

| KR | 10-0934354 B1 | 12/2009 |
| KR | 10-2010-0048004 A | 5/2010 |
| KR | 10-1275120 B1 | 6/2013 |
| KR | 10-2014-0133032 A | 11/2014 |
| WO | WO 2018/124452 A1 | 7/2018 |

OTHER PUBLICATIONS

Lee et al., "Simultaneous Determination of Berth Schedule and Quay Crane Allocation," Journal of the Korean Society of Supply Chain Management, 10(2):51-62, (2010). [English Abstract].

Park et al., "A Multi-objective Co-operative Co-evolutionary Algorithm for Remarshaling in an Automated Container Terminal," 11 pages, (2012). [English Abstract].

WIPO Application No. PCT/KR2017/012358, PCT International Search Report dated Mar. 2, 2018.

SYSTEM AND METHOD FOR PLANNING YARD CRANE WORK

CROSS REFERENCE TO RELATED APPLICATIONS

The present application claims priority to and is a continuation of International Patent Application PCT/KR2017/012358, filed Nov. 2, 2017, which claims priority to Korean Patent Application No. 10-2016-0179604, filed on Dec. 27, 2016, and Korean Patent Application No. 10-2017-0031546, filed on Mar. 14, 2017, the contents of which are incorporated herein by reference in their entirety.

FIELD OF THE INVENTION

The present invention relates to a system and method for planning yard crane work, and more particularly to a system and method for planning yard crane work based on a strategy-based planning method.

BACKGROUND OF THE INVENTION

A container terminal can be roughly divided into three areas, i.e., a quay, a yard and a hinterland. The quay is a place where a ship temporarily anchors. At the quay, containers are loaded into or unloaded from the ship. The yard is a temporary storage place for containers before they are exported or imported. The hinterland is a place where external trucks carrying containers come in and out.

In particular, since many containers enter and leave the yard every day, an efficient operation of the yard has a significant impact on the overall productivity of the container terminal. Accordingly, it is required to operate the yard with an optimized strategy in the field.

A yard crane work plan of the container terminal determines which container to stack where. For example, the yard crane work plan of the container terminal can determine a crane work assignment problem and a container device positioning problem.

The crane work assignment problem is a matter of determining the container which the crane of the yard will work with. Since the container terminal has different types of containers depending on the purposes, if the crane transports containers at random, the transportation of the other crane may be interrupted.

Further, the container device positioning problem is a matter of determining the stacking position of the containers entering the yard. When containers are stacked in the yard, since there is a limitation due to the size, weight or the like, if the containers are stacked at random, an available space of the yard may become insufficient.

Therefore, optimization of the yard crane work plan is required. To this end, a strategy-based planning method can be used. However, a conventional strategy-based planning method has a problem that it specializes only in work scenarios used in search for strategies. In other words, the conventional strategy-based planning method exhibits good performance only in specialized work scenarios and poor performance in other work scenarios, which is problematic.

BRIEF SUMMARY OF THE INVENTION

The present invention provides a yard crane work planning system which exhibits improved performance in various work scenarios.

The present invention also provides a yard crane work planning method which exhibits improved performance in various work scenarios.

However, objects of the present invention are not restricted to those set forth herein. The above and other objects of the present invention will become more apparent to one of ordinary skill in the art to which the present invention pertains by referencing the detailed description of the present invention given below.

In accordance with some embodiments of the present inventive concept, there is provided a system for planning yard crane work, comprising: a scenario providing unit configured to provide a plurality of work scenarios; a first evolution unit configured to evolve a first solution group including a plurality of first candidate solutions using a genetic algorithm; and a second evolution unit configured to evolve a second solution group including a plurality of second candidate solutions using the genetic algorithm, wherein the first evolution unit evaluates each of the first candidate solutions based on a second strategy which is the most superior candidate solution of the second solution group, wherein the second evolution unit evaluates each of the second candidate solutions based on a first strategy which is the most superior candidate solution of the first solution group, and wherein evaluating each of the first and second candidate solutions is based on a work scenario arbitrarily selected from the plurality of work scenarios.

In some embodiments, the system further comprises an input unit configured to provide first information which is information of container candidates to be evaluated and second information which is information of yard position candidates to be evaluated; a determination unit configured to determine a target container for work using the first strategy and the first information, and determine a container stacking position using the second strategy and the second information; and a stacking unit configured to stack the container according to the determination of the determining unit.

In some embodiments, the first information includes data information of a container, and the second information includes position information of a yard.

In some embodiments, the genetic algorithm comprises selecting the most inferior candidate solution of a target solution group as an inferior candidate solution, selecting a first parent from the target solution group, applying crossover and mutation to the first parent to generate a first child, selecting a second parent from the target solution group, selecting a second child most similar to the first child from the second parent, selecting a more superior child of the first and second children as a superior candidate solution, and replacing the inferior candidate solution with the superior candidate solution to evolve the target solution group.

In some embodiments, the genetic algorithm comprises evaluating all candidate solutions of the target solution group a first number of times based on the work scenario, evaluating the first child a second number of times based on the work scenario, and evaluating the second child a third number of times greater than the second number based on the work scenario.

In some embodiments, the evaluating the second child comprises evaluating the second child after evaluating the first child.

In some embodiments, the second number is equal to the first number.

In some embodiments, selecting the second parent comprises selecting the second parent after selecting the first parent.

In some embodiments, the first evolution unit repeats evolving the first solution group until the evolved first solution group converges, and the second evolution unit repeats evolving the second solution group until the evolved second solution group converges.

In accordance with some embodiments of the present inventive concept, there is provided a method for planning yard crane work, comprising: providing a plurality of work scenarios; evolving a first solution group including a plurality of first candidate solutions using a genetic algorithm; and evolving a second solution group including a plurality of second candidate solutions using the genetic algorithm, wherein the evolving a first solution group comprises evaluating each of the first candidate solutions based on a second strategy which is the most superior candidate solution of the second solution group, wherein the evolving a second solution group comprises evaluating each of the second candidate solutions based on a first strategy which is the most superior candidate solution of the first solution group, and wherein evaluating each of the first and second candidate solutions is based on a work scenario arbitrarily selected from the plurality of work scenarios.

In some embodiments, the method further comprises determining a target container for work using the first strategy; and determining a container stacking position using the second strategy.

In some embodiments, the determining a target container for work comprises further using data information of a container, and the determining a container stacking position comprises further using position information of a yard.

In some embodiments, the evolving a first solution group and the evolving a second solution further comprises evolving the first solution group and evolving the second solution a predetermined number of repetitions, respectively The details of other embodiments are included in the detailed description and the drawings.

DETAILED DESCRIPTION OF THE INVENTION

Figure 1:
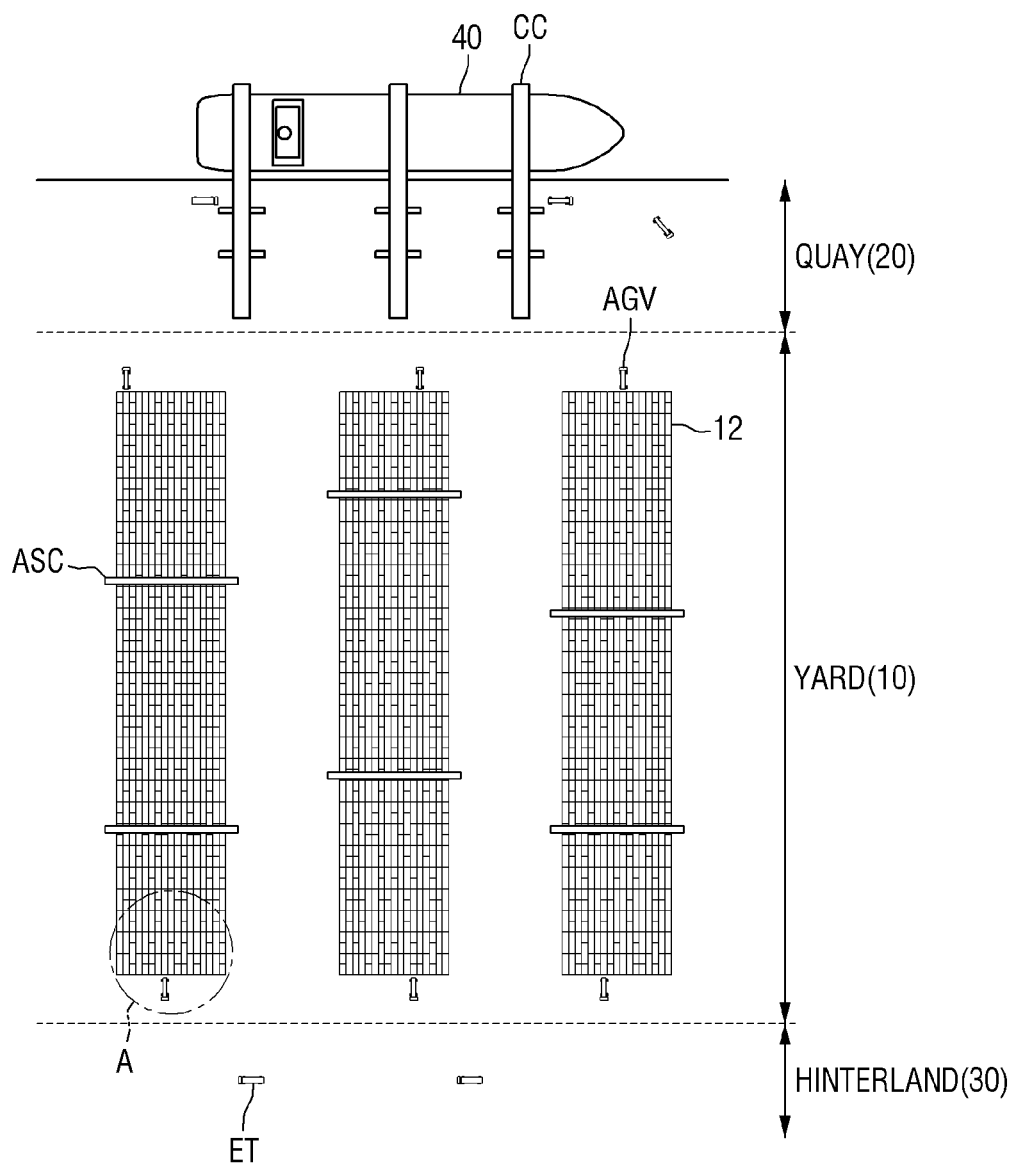
FIG. 1 is a conceptual diagram showing a container terminal.

Embodiments of the present inventive concept provide at least the following effects.

The yard crane work planning system and method according to some embodiments can derive an optimized strategy in various work scenarios.

Further, the yard crane work planning system and method according to some embodiments can derive an optimized strategy by minimizing the noise.

The effects of the present invention are not limited to the above-described effects and other effects which are not described herein will become apparent to those skilled in the art from the following description.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Throughout the specification, like reference numerals in the drawings denote like elements.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprise," "comprises," "comprising," "includes," "including," and "include," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a yard crane work planning system according to some embodiments of the present inventive concept will be described with reference to FIGS. 1 to 4.

Figure 2:
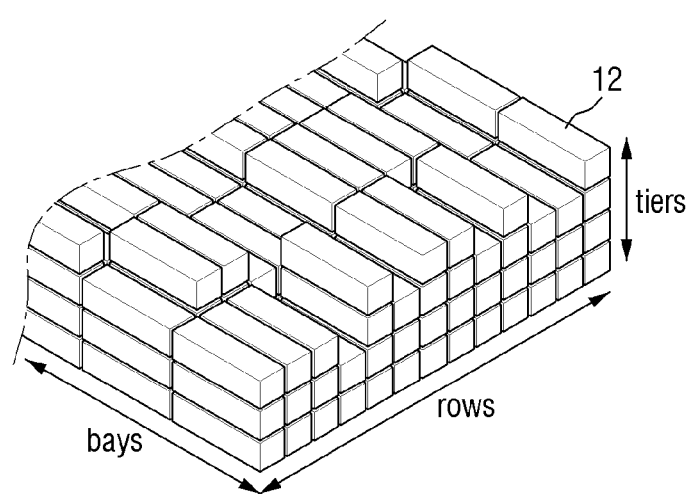
FIG. 2 is an enlarged view of portion A of FIG. 1.
Figure 3:
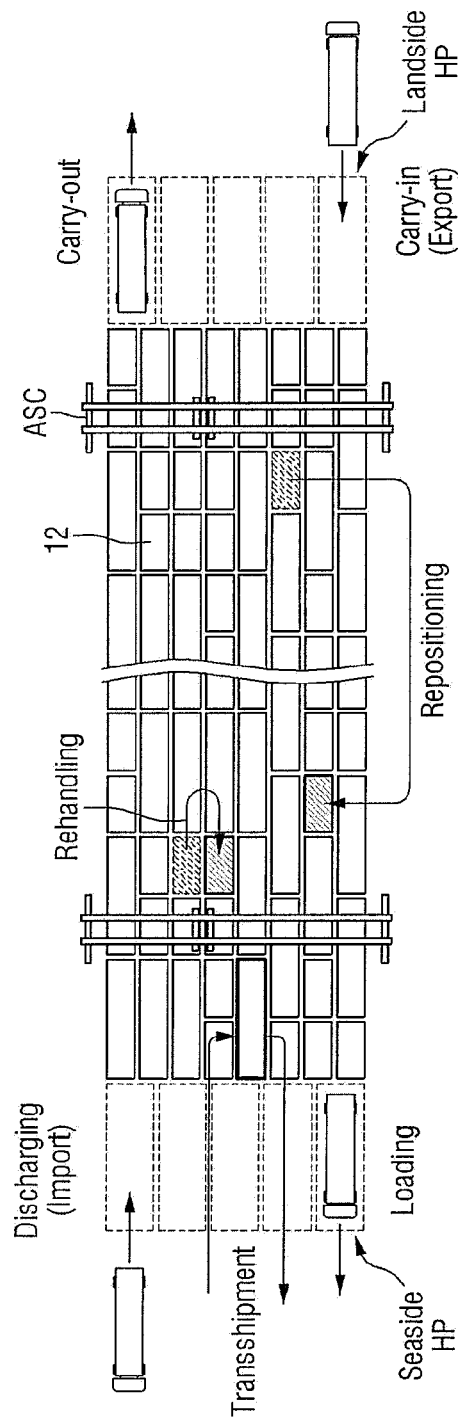
FIG. 3 is a conceptual diagram illustrating an operation of a yard crane for stacking containers.

FIG. 1 is a conceptual diagram showing a container terminal. FIG. 2 is an enlarged view of portion A of FIG. 1. FIG. 3 is a conceptual diagram illustrating an operation of a yard crane for stacking containers.

Referring to FIG. 1, the container terminal includes a quay 20, a yard 10, and a hinterland 30.

The quay 20 is an area where a ship 40 anchors. Containers 12 may be unloaded from the ship 40 by a container crane CC. The unloaded containers 12 may be transported to the yard 10 by an internal transport vehicle (automated guided vehicle (AGV)). Further, the containers 12 stacked in the yard 10 may be transported to the quay 20 by the internal transport vehicle (AGV). The transported containers 12 may be loaded onto the ship 40 by the container crane CC.

The yard 10 is an area where the containers 12 are temporarily stacked. The containers 12 transported by the internal transport vehicle (AGV) to the yard 10 may be stacked in the yard 10 by a yard crane (automated stacking crane (ASC)). The stacked containers 12 may be transported to the quay 20 and then loaded onto the ship 40 again, or transported to the hinterland 30.

As illustrated, the containers 12 may be stacked into a plurality of blocks arranged perpendicular to a direction in which the ship 40 docks. A plurality of yard cranes (ASCs) may stack containers 12 into each block. The internal transport vehicle (AGV) may move between the respective blocks. Contrary to the illustration, the containers 12 may be stacked into a plurality of blocks arranged horizontally in the direction in which the ship 40 docks.

The hinterland 30 is an area connected to the yard 10 at the land side. An external truck ET may move in the hinterland 30. The containers of the yard 10 may be transported to the hinterland 30 by the external truck ET. Further, the external truck ET may transport the containers from the hinterland 30 to the yard 10. That is, the hinterland 30 is an area for transporting the containers 12 between the yard 10 and another place on the land side.

Referring to FIG. 2, the containers 12 may be stacked in a block within the yard 10. A block may have a certain length (bays), a certain width (rows) and a certain height (tiers). Here, the length (bays) means a distance in the long-edge direction of the containers 12 having a rectangular parallelepiped shape, and the width (rows) means a distance in the short-edge direction of the containers 12.

The movement of the containers 12 will be described with reference to FIG. 3. A portion where the yard 10 leads to the quay 20 is referred to as a seaside handover point (HP). In addition, a portion where the yard 10 leads to the hinterland 30 is referred to as a landside handover point. The containers 12 may come in and out at each handover point. The external truck ET may move from the landside handover point to the hinterland 30.

As described above, the yard crane (ASC) may stack the containers 12. In this case, the containers 12 may be imported from the ship or exported from the land side. The stacked containers 12 may be loaded onto the ship or may be carried out to the land side. Further, the containers 12 may also be unloaded from the ship and transshipped to another ship. Although not particularly limited to a single block, two or more yard cranes (ASCs) may be installed in the yard 10.

In addition, the yard crane (ASC) may be used to rearrange or rehandle the containers 12. The rearranging is to move the containers 12 to a position in the yard 10 where the yard crane (ASC) in a desired direction can reach when the containers 12 have to be moved from the sea side or the land side to the opposite side. In the rearranging, moving the containers 12 when the containers 12 need to be immediately transported to the land or shipped is referred to as repositioning. The rehandling is to move the corresponding container 12 when it is not necessary for the corresponding container 12 to be moved but the container 12 positioned below the corresponding container 12 has to be moved.

Figure 4:
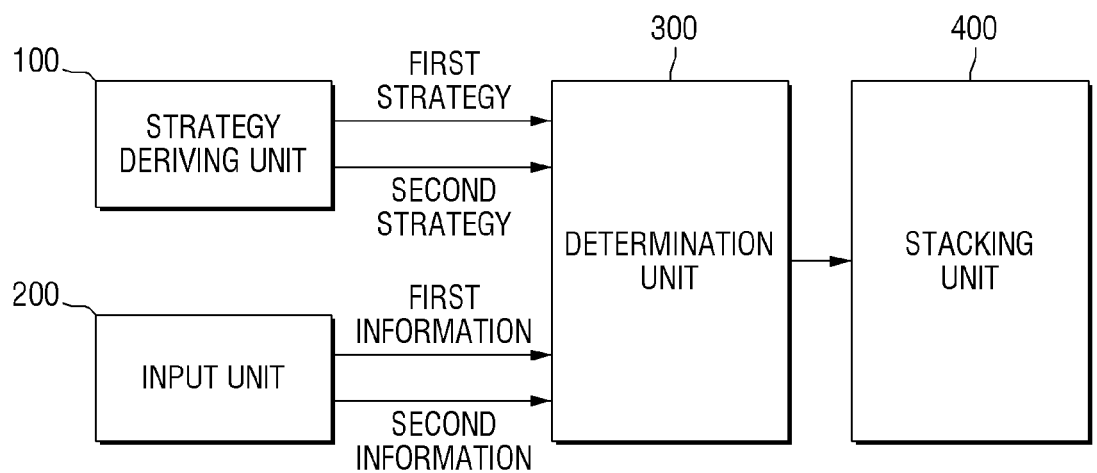
FIG. 4 is a block diagram of a yard crane work planning system according to some embodiments of the present inventive concept.

FIG. 4 is a block diagram of a yard crane work planning system according to some embodiments of the present inventive concept.

Referring to FIG. 4, the yard crane work planning system according to some embodiments includes a strategy deriving unit 100, an input unit 200, a determination unit 300, and a stacking unit 400.

The yard crane work planning system according to the present embodiment is based on a strategy-based planning method. The strategy-based planning method is a planning method for calculating a score based on various evaluation criteria for each candidate of a given candidate group and selecting a candidate having the highest score.

Each of the evaluation criteria of the strategy-based planning method may has a different importance, and each of the evaluation criteria may be weighted according to the importance. In this case, a combination of weights assigned to the respective evaluation criteria is referred to as a strategy. Specifically, the strategy-based planning method can provide a score function as represented in Eq. 1:

$$s(x) = \Sigma_{i=1}^{n} w_i \cdot f_i(x) \qquad \text{Eq. 1}$$

where x is an input value, s(x) is a score function, $f_i(x)$ is an evaluation criteria function, $w_i$ is a weighting constant of each evaluation criteria function, and n is a natural number. That is, the score function is the sum of the values obtained by multiplying each evaluation criteria function by the weighting constant. In this case, a set of $w_1$ to $w_n$ is a strategy.

A yard crane work planning system according to some embodiments may determine a target container for work and a container stacking location.

For example, when the yard crane (ASC) intends to determine which container 12 to work with, the containers 12 that can be the target of work may be candidates. That is, s(x) may evaluate each of the scores of the container candidates that can be the target of work. For example, s(x) may evaluate each of the scores of the containers 12 which need to be processed within a certain time.

In this case, x is the information of the container candidates to be evaluated, and $f_i(x)$ is the evaluation criteria function for evaluating the container candidates to be evaluated. For example, x may include data information such as weights and sizes of the container candidates to be evaluated. Accordingly, the container candidate having the highest value of s(x) may be determined as the target container for work.

Also, for example, when the yard crane (ASC) intends to determine a position to stack the container 12, s(x) may evaluate each of the scores of yard position candidates that can be the target of stacking. For example, s(x) may evaluate each of the scores of the positions of the yard 10 where the container 12 can be stacked.

In this case, x is the information of the yard position candidates to be evaluated, and $f_i(x)$ is the evaluation criteria function for evaluating the yard position candidates to be evaluated. For example, x may include position information of the yard such as the coordinate values of the yard position candidates to be evaluated. Accordingly, the yard position candidate having the highest value of s(x) may be determined as the container stacking position.

The strategy deriving unit 100 may derive the strategy by optimizing it. That is, the strategy deriving unit 100 may derive a set of all $w_i$ values (i.e., $w_1$ to $w_n$) of Eq. 1 by optimizing it.

Specifically, the strategy deriving unit 100 may provide a strategy (hereinafter, a first strategy) for determining a target container for work. In addition, the strategy deriving unit 100 may provide a strategy (hereinafter, a second strategy) for determining a container stacking position. Further, the strategy deriving unit 100 may derive the first strategy and the second strategy by optimizing them. This will be described in detail later with reference to FIGS. 5 to 7.

The input unit 200 may provide an input value. That is, the input unit 200 may provide x of Eq. 1.

Specifically, the input unit 200 may provide the information (hereinafter, first information) of the container candidates to be evaluated. Further, the input unit 200 may provide the information (hereinafter referred to as second information) of the yard position candidates to be evaluated.

The determination unit 300 may determine the target container for work and the container stacking position to be provided to the yard crane (ASC). That is, the determination unit 300 may calculate s(x) using Eq. 1 as represented above and determine a candidate having the highest value of s(x).

Specifically, the determination unit 300 may receive the first strategy from the strategy deriving unit 100, receive the first information from the input unit 200, and determine a target container for work to be performed by the yard crane (ASC). Further, the determination unit 300 may receive the second strategy from the strategy deriving unit 100, and receive the second information from the input unit 200 to determine the container stacking position at which the yard crane (ASC) will stack the container. This will be described in detail later with reference to FIG. 8.

The stacking unit 400 may stack the containers 12 in the yard 10 according to the determination of the determination unit 300. Specifically, the stacking unit 400 may correspond to the yard crane (ASC). However, the technical idea of the present inventive concept is not limited thereto, and the stacking unit 400 may include any device capable of stacking the containers 12 according to the determination of the determination unit 300.

Hereinafter, the operation of the strategy deriving unit 100 according to some embodiments will be described in detail with reference to FIGS. 5 to 7.

Figure 5:
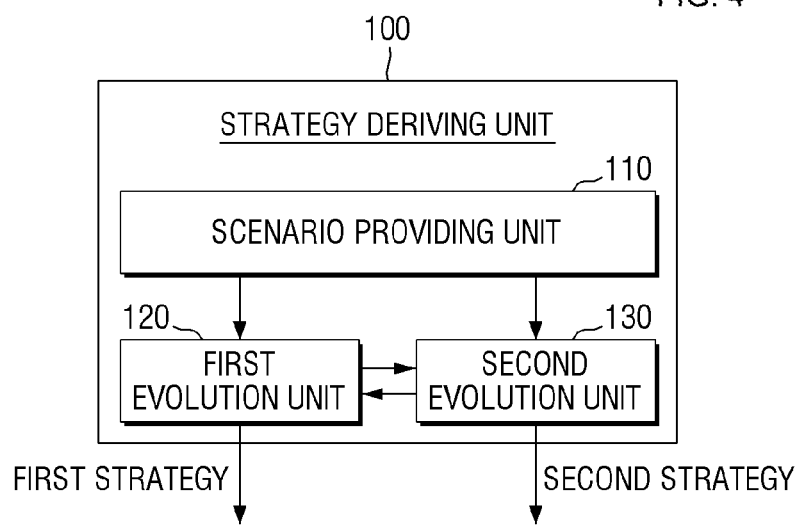
FIG. 5 is a block diagram of a strategy deriving unit of FIG. 4.

FIG. 5 is a block diagram of the strategy deriving unit of FIG. 4. FIG. 6 is a diagram explaining a coevolution algorithm for the first and second evolution units of FIG. 5. FIG. 7 is a diagram explaining a genetic algorithm for the first and second evolution units of FIG. 5.

Referring to FIG. 5, the strategy deriving unit 100 may include a scenario providing unit 110, a first evolution unit 120 and a second evolution unit 130.

The scenario providing unit 110 may provide a plurality of work scenarios. Here, the work scenario is a scenario of the yard crane work. The yard may have several work scenarios depending on various operation conditions. Accordingly, the scenario providing unit 110 may provide different scenarios of the yard crane work.

These work scenarios may be used to evaluate the superiority or inferiority of strategies. For example, in order to evaluate the first strategy, which is a strategy for determining the target container for work, a particular work scenario may be required. That is, evaluating a particular strategy may be performed based on the work scenario provided by the scenario providing unit 110.

The first evolution unit 120 may evolve a first solution group including a plurality of candidate strategies (hereinafter referred to as first candidate solutions) for determining a target container for work. Specifically, the first evolution unit 120 may use a genetic algorithm to evolve a first solution group including a plurality of first candidate solutions. In addition, the first evolution unit 120 may provide the most superior candidate solution of the first solution group as a first strategy.

The second evolution unit 130 may evolve a second solution group including a plurality of candidate strategies (hereinafter, second candidate solutions) for determining the container stacking position. Specifically, the second evolution unit 130 may use a genetic algorithm to evolve a second solution group including a plurality of second candidate solutions. In addition, the second evolution unit 130 may provide the most superior candidate solution of the second solution group as a second strategy.

In this case, the first evolution unit 120 and the second evolution unit 130 may use a coevolution algorithm to evolve the first solution group and the second solution group. Specifically, the first evolution unit 120 may evaluate each first candidate solution of the first solution group based on the second strategy, and evolve the first solution group. In addition, the second evolution unit 130 may evaluate each second candidate solution of the second solution group based on the first strategy, and evolve the second solution group.

Figure 6:
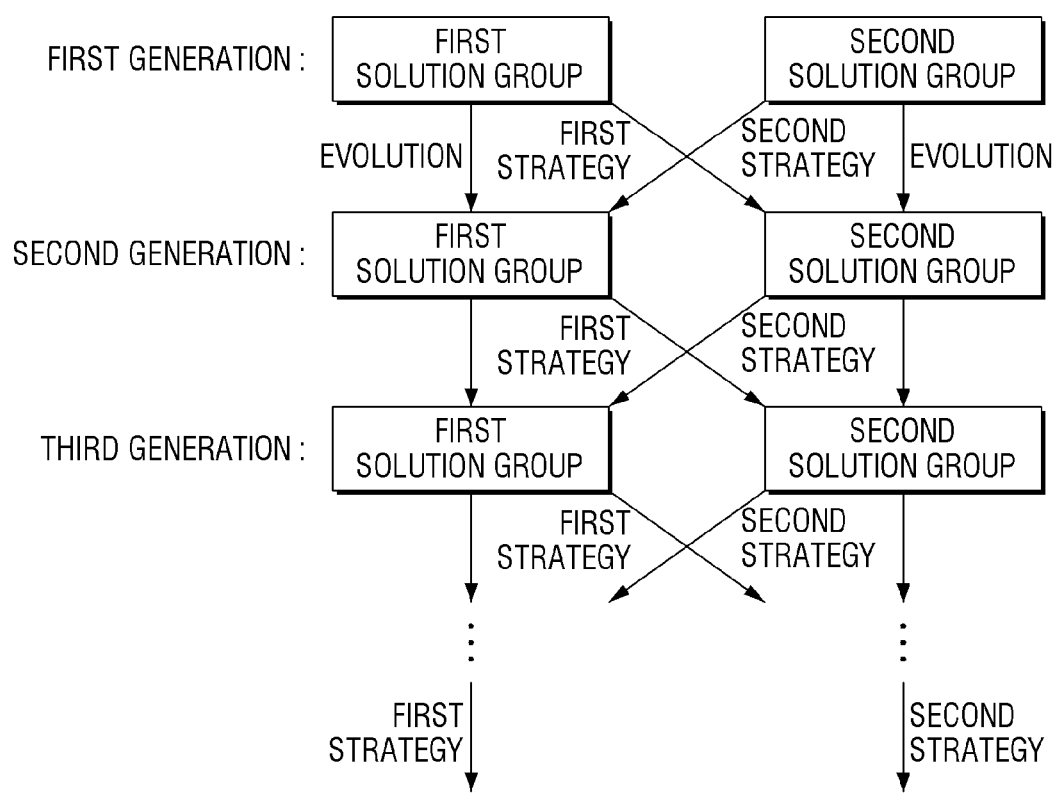
FIG. 6 is a diagram explaining a coevolution algorithm for first and second evolution units of FIG. 5.
Figure 7:
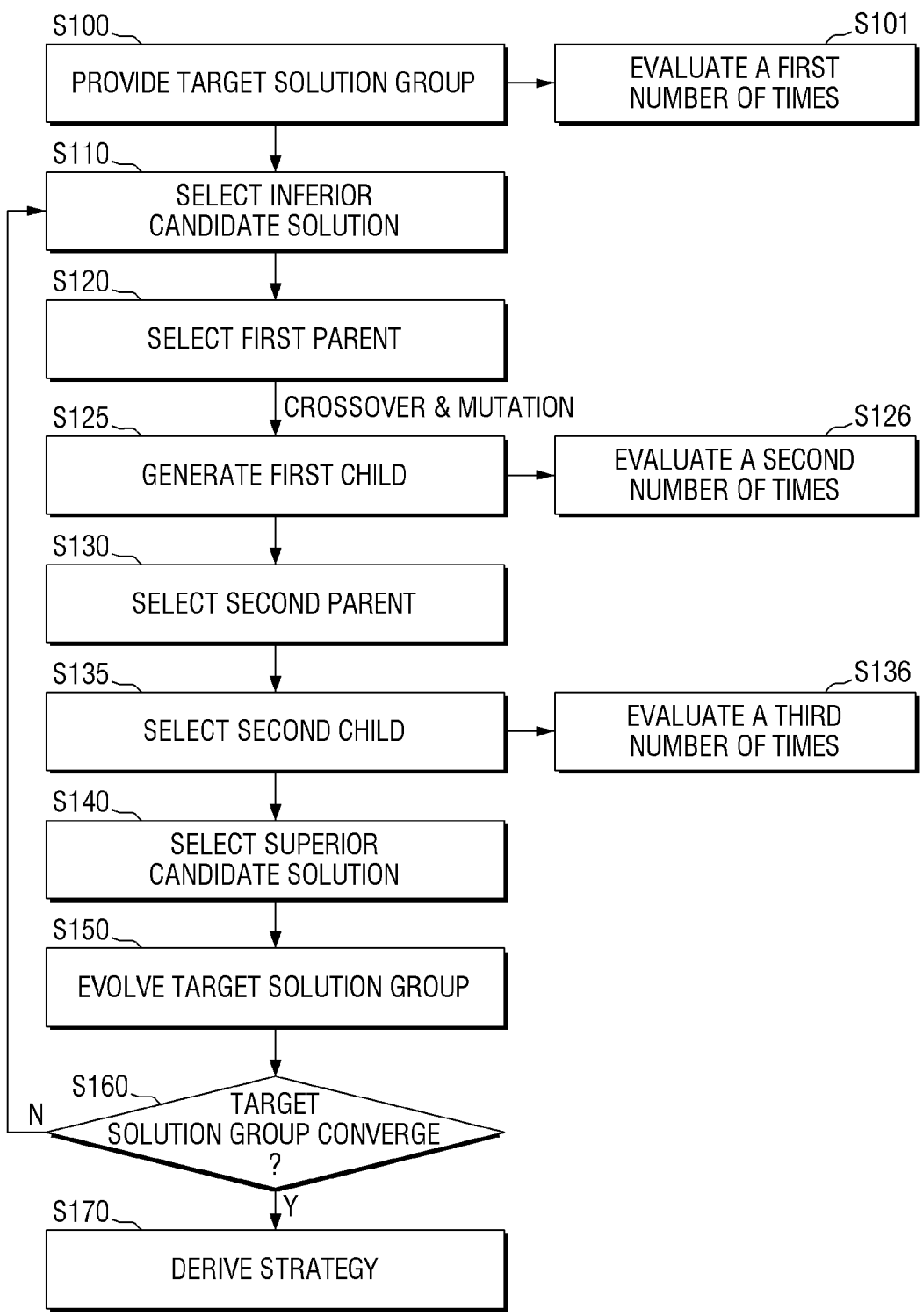
FIG. 7 is a diagram explaining a genetic algorithm for the first and second evolution units of FIG. 5.

More specifically, referring to FIG. 6, the first solution group and the second solution group may be evolved respectively. For example, a first-generation first solution group may evolve into a second-generation first solution group, and the second-generation first solution group may evolve into a third-generation first solution group.

In this case, the first evolution unit may evaluate each candidate solution of the second-generation first solution group based on the first-generation second strategy, which is the most superior candidate solution of the first-generation second solution group. Similarly, the second evolution unit may evaluate each candidate solution of the second-generation second solution group based on the first-generation first strategy, which is the most superior candidate solution of the first-generation first solution group.

That is, the first strategy, which is a strategy for determining the target container for work, may be used to evaluate the second candidate solution, which is a candidate strategy for determining the container stacking position. Similarly, the second strategy, which is a strategy for determining the stacking position, may be used to evaluate the first candidate solution, which is a candidate strategy for determining the target container for work.

The genetic algorithm used in the first evolution unit 120 and the second evolution unit 130 will be described with reference to FIG. 7. Specifically, the first evolution unit 120 and the second evolution unit 130 may use a genetic algorithm based on restricted tournament selection (RTS) to evolve the first solution group and the second solution group, respectively.

First, a target solution group, which is a solution group to be evolved by the genetic algorithm, is provided (S100). In the present embodiment, the target solution group may mean one solution group selected from the first solution group and the second solution group. However, for simplicity of description, it is assumed that the target solution group is the first solution group in the following description.

Subsequently, all candidate solutions of the target solution group are evaluated a first number of times (S101). Specifically, all the first candidate solutions of the first solution group may be evaluated the first number of times. In this case, the evaluation of each first candidate solution may be based on a work scenario arbitrarily selected from the scenario providing unit 110. That is, the first candidate solutions may be evaluated based on the same work scenario, or may be evaluated based on different work scenarios. Accordingly, the first evolution unit 120 may evaluate each first candidate solution based on various work scenarios.

Further, as described above with reference to FIG. 6, each first candidate solution may be evaluated based on the second strategy. That is, each first candidate solution may be evaluated based on the second strategy as well as the work scenario arbitrarily selected from the scenario providing unit 110. If the target solution group is the second solution group, each second candidate solution may be evaluated based on the first strategy as well as the work scenario arbitrarily selected from the scenario providing unit 110.

In some embodiments, the first number of times may be two or more. In this case, a particular first candidate solution of the first solution group may be evaluated based on the same work scenario, or may be evaluated based on different work scenarios while being evaluated two or more times. Accordingly, the first candidate solution can be evaluated based on various work scenarios.

Then, the most inferior candidate solution of the target solution group is selected as an inferior candidate solution (S110). Specifically, the most inferior first candidate solution of the first solution group may be selected as an inferior candidate solution. The inferior candidate solution may be selected by comparison with each first candidate solution evaluated in step S101.

In the case where the first number of times is two or more, the most inferior candidate solution may be selected as an inferior candidate solution by comparison with the average of each first candidate solution evaluated two or more times. However, the technical idea of the present inventive concept is not limited thereto, and it may be also possible to select an inferior candidate solution by comparison with each first candidate solution by another method.

Then, a first parent is selected from the target solution group (S120). Specifically, a first candidate solution may be arbitrarily selected from the first solution group to generate a first parent. In this case, the first parent may include a plurality of first candidate solutions, but the technical idea of the present inventive concept is not limited thereto.

Subsequently, crossover and mutation are applied to the first parent to generate a first child (S125). Specifically, crossover and mutation may be applied to the first candidate solution arbitrarily selected from the first solution group. Thus, an evolved first candidate solution that does not exist in the first parent may be generated to form the first child. In this case, the first child may include a plurality of evolved first candidate solutions, but the technical idea of the present inventive concept is not limited thereto.

Then, the first child is evaluated a second number of times (S126). In this case, the evaluation of the first child may be based on a work scenario arbitrarily selected from the scenario providing unit 110. Evaluating the first child is substantially the same as evaluating the first candidate solution. That is, similarly to the first candidate solution, the first child may be evaluated based on the second strategy as well as the work scenario arbitrarily selected from the scenario providing unit 110. If the target solution group is the second solution group, the first child may be evaluated based on the first strategy as well as the work scenario arbitrarily selected from the scenario providing unit 110.

In some embodiments, the second number of times may be equal to the first number of times. However, the technical idea of the present inventive concept is not limited thereto, and the second number of times may be different from the first number of times.

Then, a second parent is selected from the target solution group (S130). Specifically, a first candidate solution may be arbitrarily selected from the first solution group to generate a second parent. In this case, the second parent may include a plurality of first candidate solutions, but the technical idea of the present inventive concept is not limited thereto. Further, the number of first candidate solutions included in the second parent may be the same as that of the first parent, or may different from that of the first parent.

In the present embodiment, it has been described that the selection of the second parent (S130) is performed after the selection of the first parent (S120), but the technical idea of the present inventive concept is not limited thereto. That is, the selection of the second parent (S130) may be performed before the selection of the first parent (S120) or may be performed simultaneously with the selection of the first parent (S120).

Subsequently, a second child most similar to the first child is selected from the second parent (S135). When there are a plurality of first children, it may be possible to generate second children, the number of which is equal to the number of first children.

Then, the second child is evaluated a third number of times (S136). In this case, the evaluation of the second child may be based on a work scenario arbitrarily selected from the scenario providing unit 110. Evaluating the second child is substantially the same as evaluating the first candidate solution. That is, similarly to the first candidate solution, the second child may be evaluated based on the second strategy as well as the work scenario arbitrarily selected from the scenario providing unit 110. If the target solution group is a second solution group, the second child may be evaluated based on the first strategy as well as the work scenario arbitrarily selected from the scenario providing unit 110.

In some embodiments, the third number of times may be greater than the second number of times. That is, the second child may be evaluated based on more various work scenarios than the first child. Since the second child is similar to the first child, being selected as the second child means that there is a high probability of a superior candidate solution. That is, by evaluating the second child multiple times based on different work scenarios, noise can be eliminated and a superior candidate solution can be evaluated more accurately.

In the present embodiment, it has been described that the evaluation of the second child (S136) is performed after the evaluation of the first child (S126), but the technical idea of the present inventive concept is not limited thereto. That is, the evaluation of the second child (S136) may be performed before the evaluation of the first child (S126) or may be performed simultaneously with the evaluation of the first child (S126).

Subsequently, a more superior child between the first child and the second child is selected as a superior candidate solution (S140). The superior candidate solution may be selected by comparing the first child and the second child evaluated in step S126 and step S136.

When each of the second number and the third number is two or more, a more superior candidate solution may be selected as a superior candidate solution by comparison with the average of each first child and each second child evaluated two or more times. However, the technical idea of the present inventive concept is not limited thereto, and it may be also possible to select a superior candidate solution by comparison with each first child and each second child by another method.

Subsequently, the inferior candidate solution is replaced with the superior candidate solution, and the target solution group is evolved (S150). Specifically, the most inferior candidate solution among the first candidate solutions of the first solution group may be replaced with a more superior candidate solution of the first child and the second child to evolve the first solution group. Accordingly, the first solution group may include a more improved first candidate solution.

Then, evolving the target solution group is repeatedly performed until the evolved target solution group converges (S160). Specifically, evolving the first solution group may be repeatedly performed until the evolved first solution group converges.

Whether the evolved first solution group converges may be determined based on whether a difference between the evolved first solution group and the first solution group before evolution is within a tolerance range. Specifically, if the difference between the evolved first solution group and the first solution group before evolution is outside the tolerance range, the previous steps (S110 to S150) are repeated to evolve the first solution group again. However, the technical idea of the present inventive concept is not limited thereto, and evolving the target solution group may be performed a predetermined number of times.

If the evolved target solution group converges, the most superior candidate solution is derived as a strategy. Specifically, when the evolved first solution group converges, the most superior first candidate solution may be derived as the first strategy. In the case where the target solution group is the second solution group, the genetic algorithm according to FIG. 7 can derive the second strategy.

Accordingly, the strategy deriving unit 100 can derive the optimized first strategy and second strategy by using the scenario providing unit 110, the first evolution unit 120 and the second evolution unit 130.

Hereinafter, the operation of the determination unit 300 according to some embodiments will be described in detail with reference to FIG. 8.

Figure 8:
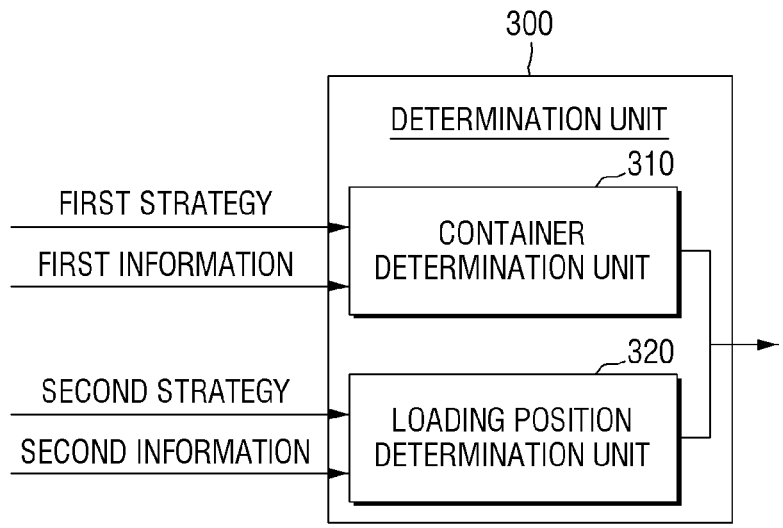
FIG. 8 is a block diagram of a determination unit of FIG. 4.

FIG. 8 is a block diagram of the determination unit of FIG. 4.

Referring to FIG. 8, the determination unit 300 may include a container determination unit 310 and a stacking position determination unit 320.

The container determination unit 310 may receive the first strategy from the strategy deriving unit 100 and receive the first information from the input unit 200 to determine a target container for work. Specifically, the container determination unit 310 can determine the target container for work using Eq. 2:

$$s_1(y) = \Sigma_{i=1}^{l} w_{1i} \cdot f_{1i}(y) \quad \text{Eq. 2}$$

where y is the first information and $w_{1i}$ is the first strategy. Further, $s_1(y)$ is a score function for determining a target container for work, and $f_{1i}(y)$ is an evaluation criteria function for evaluating a container candidate to be evaluated. Accordingly, the container determination unit 310 can determine the container candidate having the highest value of $s_1(y)$ as the target container for work.

The stacking position determination unit 320 may receive the second strategy from the strategy deriving unit 100 and receive the second information from the input unit 200 to determine the container stacking position. Specifically, the stacking position determination unit 320 can determine the target container for work using Eq. 3:

$$s_2(z) = \Sigma_{i=1}^{m} w_{2i} \cdot f_{2i}(z) \quad \text{Eq. 3}$$

where z is the second information and $w_{2i}$ is the second strategy. Further, $s_2(z)$ is a score function for determining a target container for work, and $f_{2i}(z)$ is an evaluation criteria function for evaluating a container candidate to be evaluated. Accordingly, the stacking position determination unit 320 can determine the container candidate having the highest value of $s_2(z)$ as the target container for work.

Therefore, the yard crane work planning system according to some embodiments of the technical idea of the present inventive concept can derive an optimized strategy in various work scenarios. In addition, the yard crane work planning system according to some embodiments can minimize the noise and derive an optimized strategy. Accordingly, the yard crane work planning system according to some embodiments may exhibit improved performance in various work scenarios.

Hereinafter, a yard crane work planning method according to some embodiments of the present inventive concept will be described with reference to FIG. 9. For simplicity of description, a repeated description similar to the description with reference to FIGS. 1 to 8 will be briefly described or omitted.

Figure 9:
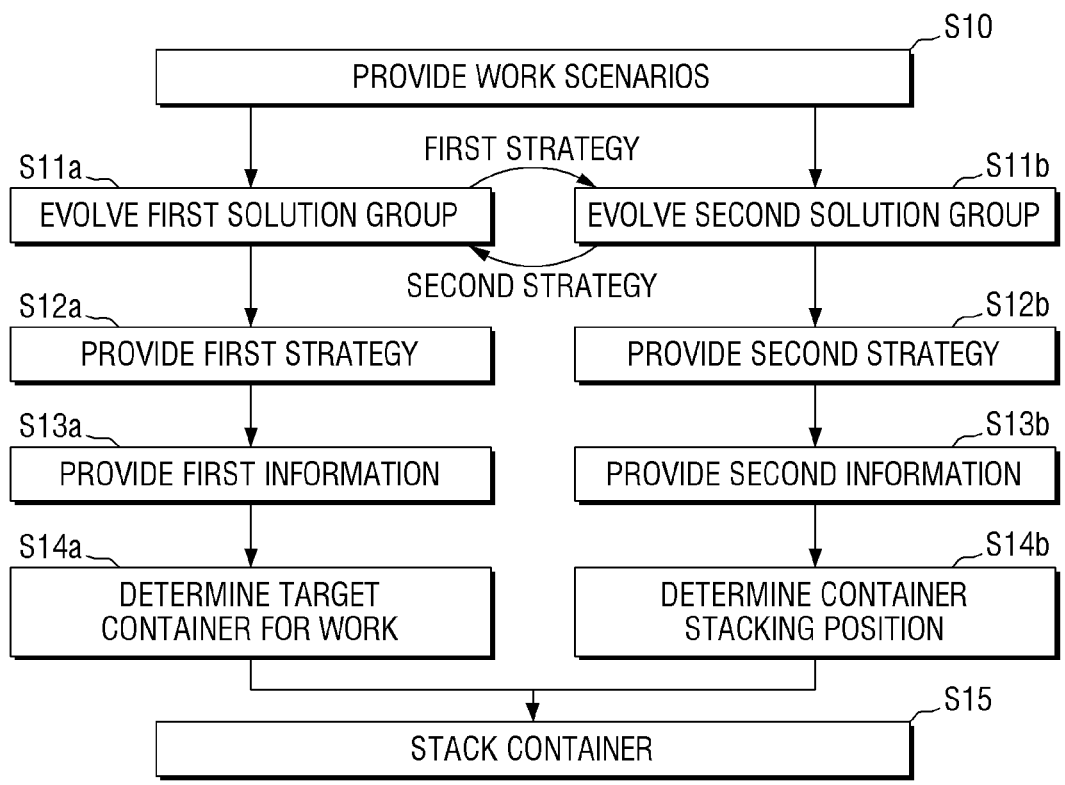
FIG. 9 is a flowchart of a yard crane work planning method according to some embodiments of the present inventive concept.

FIG. 9 is a flowchart of a yard crane work planning method according to some embodiments of the present inventive concept.

Referring to FIG. 9, first, a plurality of work scenarios are provided (S10).

Then, a first solution group including a plurality of first candidate solutions is evolved using a genetic algorithm (S11a). In addition, a second solution group including a plurality of second candidate solutions is evolved using the genetic algorithm (S11b).

Specifically, evolving the first solution group and the second solution group may be performed using the coevolution algorithm described above with reference to FIG. 6. That is, evolving the first solution group (S11a) may include evaluating each first candidate solution of the first solution group based on the second strategy and evolving the first solution group. In addition, evolving the second solution group (S11b) may include evaluating each second candidate solution of the second solution group based on the first strategy and evolving the second solution group.

Further, evolving each of the first solution group and the second solution group may be performed using the genetic algorithm described with reference to FIG. 7.

Then, a first strategy derived from the first solution group is provided (S12a). Also, a second strategy derived from the second solution group is provided (S12b).

Specifically, evolving the first solution group may be repeatedly performed until the first solution group evolved in step S11a converges, and evolving the second solution group may be repeatedly performed until the second solution group evolved in step S11b converges. If the evolved first solution group converges, the most superior first candidate solution may be derived as the first strategy. Similarly, if the evolved second solution group converges, the most superior second candidate solution may be derived as the second strategy.

Subsequently, the first information which is information of the container candidates to be evaluated is provided (S13a). Further, the second information which is information of the yard position candidates to be evaluated is provided (S13b).

Subsequently, a target container for work is determined using the first strategy and the first information (S14a). In addition, the container stacking position is determined using the second strategy and the second information (S14b).

Then, the container is stacked according to the target container for work and the container stacking position determined by steps S14a and S14b. Specifically, the yard crane (ASC) may stack the container 12 according to the target container for work and the container stacking position determined by steps S14a and S14b.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims. Therefore, it should be understood that the above exemplary embodiments are only exemplary, but are not limited.

What is claimed is:

1. A system for planning yard crane work, comprising:
 a scenario providing unit configured to provide a plurality of yard crane work scenarios to be implemented by a yard work crane;
 a first evolution unit configured to evolve a first solution group including a plurality of first candidate solutions for determining a target container for yard crane work, using a genetic algorithm; and
 a second evolution unit configured to evolve a second solution group including a plurality of second candidate solutions for determining a container stacking position, using the genetic algorithm,
 wherein each of the first candidate solutions is expressed as a combination of weights assigned to a plurality of evaluation criteria for determining the target container for yard crane work,
 wherein each of the second candidate solutions is expressed as a combination of weights assigned to a plurality of evaluation criteria for determining the container stacking position,
 wherein the genetic algorithm comprises:
  selecting the most inferior candidate solution of a target solution group as an inferior candidate solution, the target solution group selected from the first and second solution groups;
  selecting a first parent from the target solution group;
  applying crossover and mutation to the first parent to generate a first child;
  selecting a second parent from the target solution group;
  selecting a second child most similar to the first child from the second parent;
  selecting a more superior child of the first and second children as a superior candidate solution; and
  replacing the inferior candidate solution with the superior candidate solution to evolve the target solution group,
 wherein the first evolution unit evaluates each of the first candidate solutions based on a second strategy which is the most superior candidate solution of the second solution group,
 wherein the second evolution unit evaluates each of the second candidate solutions based on a first strategy which is the most superior candidate solution of the first solution group, and
 wherein evaluating each of the first candidate solutions and each of the second candidate solutions is based on a yard crane work scenario arbitrarily selected from the plurality of yard crane work scenarios at each evaluation.

2. The system of claim 1, further comprising:
 an input unit configured to provide first information which is information of container candidates to be evaluated and second information which is information of yard position candidates to be evaluated;
 a determination unit configured to determine the target container for work using the first strategy and the first information, and determine the container stacking position using the second strategy and the second information; and
 a stacking unit configured to stack the container according to the determination of the determining unit.

3. The system of claim 2, wherein the first information includes data information of a container, and the second information includes position information of a yard.

4. The system of claim 1, wherein the genetic algorithm comprises:
 evaluating all candidate solutions of the target solution group a first number of times based on the work scenario,
 evaluating the first child a second number of times based on the work scenario, and
 evaluating the second child a third number of times greater than the second number based on the work scenario.

5. The system of claim 4, wherein the evaluating the second child comprises evaluating the second child after evaluating the first child.

6. The system of claim 4, wherein the second number is equal to the first number.

7. The system of claim 1, wherein selecting the second parent comprises selecting the second parent after selecting the first parent.

8. The system of claim 1, wherein the first evolution unit repeats evolving the first solution group until the evolved first solution group converges, and
 the second evolution unit repeats evolving the second solution group until the evolved second solution group converges.

9. A method for planning yard crane work for a yard crane, comprising:
 determining a target container for yard crane work and a container stacking position using a strategy deriving unit; and
 stacking a container according to the determined target container for the yard crane work and the determined container stacking position,
 wherein the strategy deriving unit is configured for:
  providing a plurality of yard crane work scenarios;
  evolving a first solution group including a plurality of first candidate solutions for determining the target container for yard crane work, using a genetic algorithm; and
  evolving a second solution group including a plurality of second candidate
  solutions for determining the container stacking position, using the genetic algorithm,
 wherein each of the first candidate solutions is expressed as a combination of weights assigned to a plurality of evaluation criteria for determining the target container for the yard crane work,
 wherein each of the second candidate solutions is expressed as a combination of weights assigned to a plurality of evaluation criteria for determining the container stacking position,
 wherein the genetic algorithm comprises:
  selecting the most inferior candidate solution of a target solution group as an inferior candidate solution, the target solution group selected from the first and second solution groups;
  selecting a first parent from the target solution group;
  applying crossover and mutation to the first parent to generate a first child;
  selecting a second parent from the target solution group;
  selecting a second child most similar to the first child from the second parent;
  selecting a more superior child of the first and second children as a superior candidate solution; and replacing the inferior candidate solution with the superior candidate solution to evolve the target solution group, wherein the evolving a first solution group comprises evaluating each of the first candidate solutions based on a second strategy which is the most superior candidate solution of the second solution group, wherein the evolving a second solution group comprises evaluating each of the second candidate solutions based on a first strategy which is the most superior candidate solution of the first solution group, wherein evaluating each of the first candidate solutions and each of the second candidate solutions is based on a yard crane work scenario arbitrarily selected from the plurality of yard crane work scenarios at each evaluation, and implementing the selected candidate solution to be used by the yard work crane.

10. The method of claim 9, wherein the determining a target container for work comprises further using data information of a container, and wherein the determining a container stacking position comprises further using position information of a yard.

11. The method of claim 9, wherein the evolving a first solution group and the evolving a second solution further comprises evolving the first solution group and evolving the second solution a predetermined number of repetitions, respectively.

\* \* \* \* \*

UNITED STATES PATENT AND TRADEMARK OFFICE
CERTIFICATE OF CORRECTION

PATENT NO. : 10,636,107 B2
APPLICATION NO. : 16/221047
DATED : April 28, 2020
INVENTOR(S) : Kwang Ryel Ryu Page 1 of 1

It is certified that error appears in the above-identified patent and that said Letters Patent is hereby corrected as shown below:

On the Title Page

Add --Related U.S. Application Data
(63) Continuation of application No. PCT/KR2017/012358, filed on Nov. 2, 2017.--

Signed and Sealed this
Thirtieth Day of June, 2020

Andrei Iancu
*Director of the United States Patent and Trademark Office*